Aug. 16, 1949.   G. S. VAN VOORHIS   2,479,527
METHODS OF AND APPARATUS FOR PRODUCING RUBBER THREAD
Filed Oct. 11, 1945   2 Sheets-Sheet 1
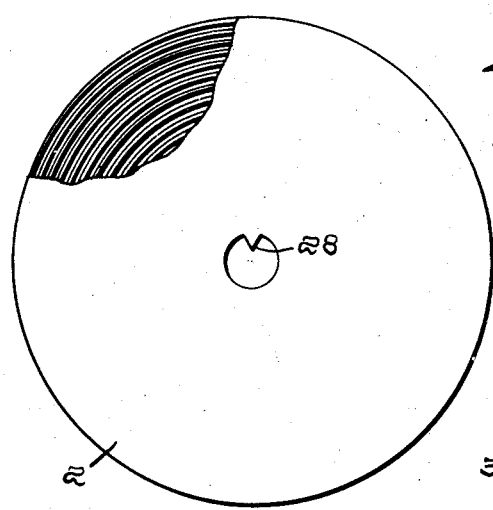
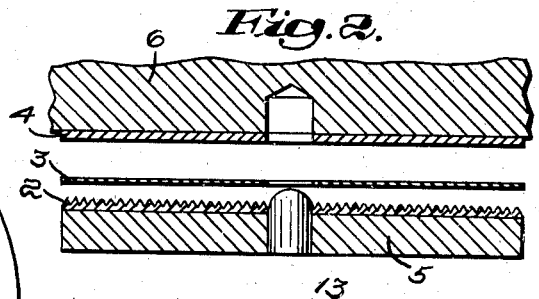
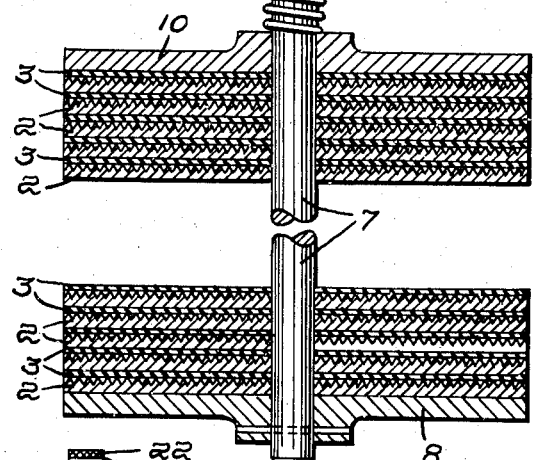
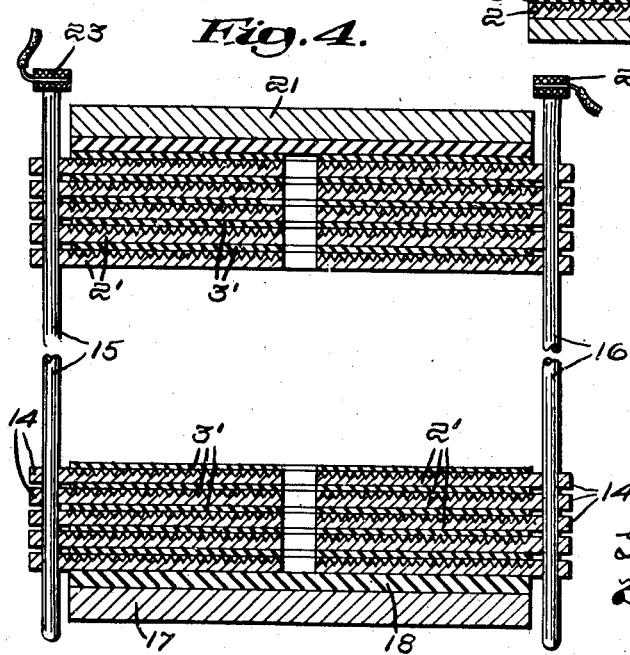

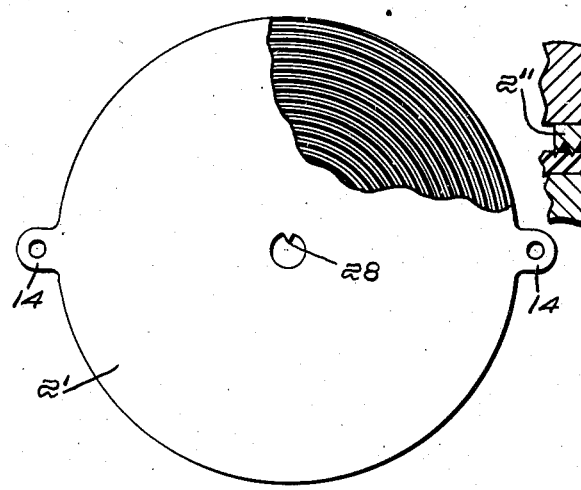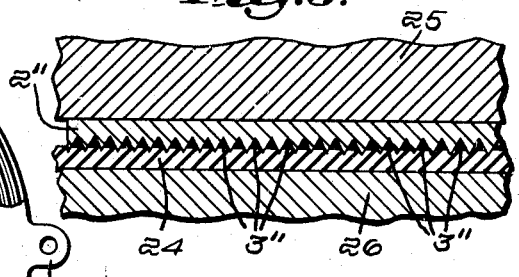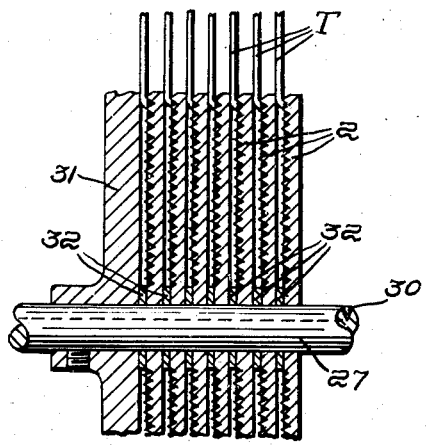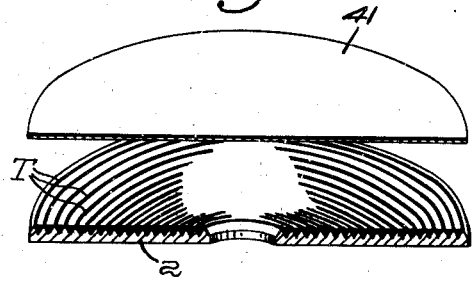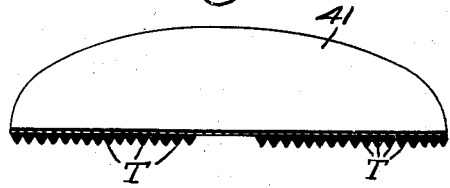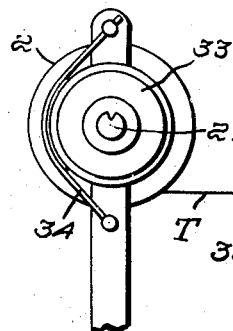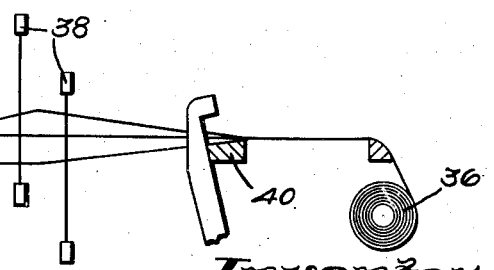

Patented Aug. 16, 1949

2,479,527

UNITED STATES PATENT OFFICE 2,479,527

METHODS OF AND APPARATUS FOR PRODUCING RUBBER THREAD

George S. Van Voorhis, Easthampton, Mass.

Application October 11, 1945, Serial No. 621,708

12 Claims. (Cl. 18—8)

This invention relates to the manufacture of rubber thread. It aims to improve both the methods of, and the apparatus for, producing rubber thread with a view to effecting economies in that operation. It is also an object of the invention to devise an exceptionally simple means for supplying rubber thread to the instrumentalities which manipulate it, together with one or more non-elastic threads, in producing elastic fabrics of various kinds, covering rubber thread, and performing similar operations.

The nature of the invention will be readily understood from the following description when read in connection with the accompanying drawings, and the novel features will be particularly pointed out in the appended claims.

In the drawings:

Fig. 1 is a plan view of a mold or die plate constructed in accordance with this invention, the drawings showing, in detail, a portion only of the grooved face of the plate;

Fig. 2 is a vertical, sectional view of an apparatus provided by this invention for use in manufacturing rubber thread in accordance with the method of this invention;

Fig. 3 is a vertical, sectional view illustrating a series of mold plates arranged in a stack for vulcanization of the threads held in them;

Fig. 4 is a view similar to Fig. 3 but showing an arrangement for performing the vulcanizing operation electrically;

Fig. 5 is a view similar to Fig. 1 showing, in plan, the form of mold plate used in Fig. 4;

Fig. 6 is a vertical, sectional view illustrating a modification of the method above described for producing rubber thread;

Fig. 7 is a vertical, sectional view illustrating a preferred method of assembling the mold plates after the threads in them have been vulcanized, and supporting them for the unwinding of the thread from them during such operations as covering the rubber thread or fabricating it with the threads in a braiding, weaving, or other machine;

Figs. 8 and 9 are angular views, partly in cross-section, illustrating additional steps which may be performed to transfer the rubber thread from the mold plate to a disk from which it may be unwound in such machines as those just mentioned; and Fig. 10 is a diagrammatic view of a loom mechanism showing one way in which the product of this invention may be handled in a machine of this type.

According to the method of making rubber thread devised by this invention, rubber in a solid continuous form is deposited in the spiral groove of a mold or die. Preferably this is accomplished by making a flat mold plate in which a spiral groove is formed, much like that in a phonograph disk, the groove being of the cross-sectional form and dimensions desired for the rubber thread. Next a sheet of unvulcanized rubber is placed on the grooved surface of the mold, the sheet being calendered to exactly the thickness of the rubber thread to be made. On the sheet of rubber so disposed a smooth surfaced pressure plate is positioned, and then this entire assembly is placed in a vulcanizing press. As the rubber softens under the heat of vulcanization, it is forced to flow into the spiral groove of the mold, and when vulcanization is completed, the mold is removed from the press, the plate is taken off, and the rubber then may be stripped from the groove in one long continuous thread. Because the unvulcanized sheet was gauged to the exact thickness required for the thread to be made, it fills the mold without any substantial overflow, and consequently, there is little or no waste. This method produces thread of highly uniform shape and dimensions.

Referring to Figs. 1 and 2, the mold plate above referred to is shown at 2, only a portion of the surface of the plate in Fig. 1 being shown as grooved; the calendered rubber sheet is indicated at 3; and the smooth surfaced pressure plate at 4. The bed plate of the press is indicated at 5; and the press head or platen at 6.

In achieving mass production of the rubber thread, it is preferable to make the mold plates 2 as thin as practicable, and this can be accomplished by initially making a steel die, with the spiral groove machined in one face of it, and then using this die to produce the desired grooved surface in the faces of a multiplicity of disks of softer material, such as aluminum, which are to be used in the manufacture of the rubber thread. If a hardened steel die of the form above described is pressed into the surface of an aluminum plate with sufficient force, the spiral pattern of the die will be transferred, in reverse, to the aluminum disk.

Later these disks can be filled with rubber in the manner above described, and they can then be stacked together, as shown in Fig. 3, to vulcanize the threads in the entire stack substantially simultaneously. The apparatus shown in Fig. 3 comprises a central shaft or rod 7 having a stiff, rigid head 8 pinned to its lower end. Mold disks 2 are assembled on this rod, alternating with rubber disks 3, until the desired number have been associated in this manner. Then a rigid top disk or head 10 is slipped on to the shaft and is backed up by a heavy spring 12 and a nut 13 which is threaded on to the upper end portion of the shaft. By tightening up the nut 13, sufficient pressure may be applied to the entire assembly for the purposes of this invention. Next, the whole assembly can be lowered into a vulcanizing kettle, and as the rubber softens during the process of vulcanization, it is forced into the spiral grooves in the mold plates, the spring 12 continuing to apply sufficient pressure to force the smooth lower surface on each mold plate into contact with the edge of the tapered spiral rib separating adjacent convolutions of the groove in the next lower plate. When vulcanization has been completed, the parts may be disassembled and the thread may be utilized in any desired manner.

Another arrangement embodying essentially the same idea, but designed for vulcanization by electric heating, is illustrated in Figs. 4 and 5. Here the disks 2' are like those shown in Figs. 1 and 2, except that each is provided with two perforated ears 14 extending from diametrically opposite points in the edge thereof, as best shown in Fig. 5. These mold plates are assembled with their intervening disks or sheets 3' of unvulcanized rubber, as in the arrangement above described, each disk being registered exactly with the one below it, and rods 15 and 16 being slipped through the holes in the ears 14—14, as shown in Fig. 4, until the desired number have been assembled. The entire stack is supported on a steel base 17 on top of which is a fairly thick mat of vulcanized rubber. Also, on top of the stack another rubber mat 20 is placed with a steel head 21 on top of it. Pressure may be applied to the entire stack in any desired manner as, for example, by weights or by placing the whole assembly in a suitable press. The two rods 15 and 16 are provided at their upper ends with binding screws 22 and 23, respectively, by means of which these rods may be connected to a suitable source of low voltage electric current of such amperage as to heat the disks to the desired temperature for vulcanization. Here again, as the rubber of the sheets 3' is softened by heat, the pressure on the stack forces the rubber into the grooves of the respective molds where it is held under pressure until vulcanization is completed. In these molds, as in those above described, the adjacent convolutions of each spiral groove are separated by an intervening spiral rib which preferably is tapered to an edge, and all of these edges in any mold lie in the same plane. The bottom face of each mold also is a plane surface which is forced into contct with the edge of the rib of the mold next below it, so that an accurate control of the shape which the thread will be made to take is afforded.

An assembly of the nature shown in Figs. 3 and 4 can also be placed in an apparatus which will perform the vulcanizing operation by ultra high-frequency electric current, the use of which for vulcanization purposes is now well known.

A variation in the foregoing methods which is very useful in providing added flexibility in the use of a given piece of molding equipment, is illustrated in Fig. 6. Here the mold plate 2" is shown after the unvulcanized rubber 3" has been forced into the grooves of the mold by its contact with a rather thick pad 24 of yielding material, such as vulcanized rubber, either natural or synthetic, the necessary pressure being applied by the upper and lower members 25 and 26 of a press. The steps performed are the same as those above described, but as the rubber is softened during vulcanization, the pad 24 forces it into the bottom of the groove in the mold plate and maintains the thread under pressure throughout the vulcanizing step. This pad forms an elastic facing on the pressure plate 26, and it is conformable both to the grooved face of the mold plate 2" and also to the rubber thread embedded in the grooves of said mold plate. Bearing in mind the fact that the thickness of the rubber thread is controlled primarily by the gauge of the unvulcanized rubber sheet which is initially inserted between the mold plate 2' and the pad 24, it will be seen that in this arrangement threads of larger or smaller size can be made in the same mold. In other words, any size of thread may be molded in this apparatus up to that permitted by the maximum depth of the groove in the mold 2". One advantage of using the yielding pad 24 is that it cooperates with the edge of the rib separating adjacent convolutions of the spiral groove to prevent the formation of any web or "flash" bridging the rib. It may be used solely for this purpose when desired.

Rubber thread so produced can be removed from the grooves in the molds in which they have been vulcanized, and wound on spools or a beam; fed to a covering machine; or handled in any manner suited to the individual requirements of the manufacturer. In some of these operations, and particularly when the rubber thread is to be used in the manufacture of an elastic fabric, it will be found advantageous to assemble a number of the mold plates 2' or 2", depending upon the number of "ends" or threads desired in the fabricating operation, and to support all of these plates on a shaft 27 where the rubber threads may be drawn simultaneously from all of the molds and guided to the weaving, braiding, or other fabricating mechanism. For this purpose each mold plate preferably is equipped with a key, Figs. 1 and 5, to fit into the keyway 30, Fig. 7, in the shaft 27. Also, head plates or disks, one of which is shown at 31, may be mounted at opposite ends of the series of mold plates to aid in holding them in their proper relationship to each other. Usually, also, it will be found desirable to separate adjacent mold plates by intervening washers, such as those shown at 32 in Fig. 7, to provide the necessary clearance for the passage of the threads T as they are drawn through the space between the grooved face of one mold plate and the rear face of the next adjacent plate.

A typical arrangement for using this rubber thread in a loom is shown in Fig. 10 where the required series of die plates 2 is mounted on the shaft 27, as there illustrated, and the latter is supported in the bearings that normally hold the rubber thread supply beam in a loom. In order to hold the threads under the desired tension, the shaft 27 has a brake drum 33 secured to it and a friction band or shoe 34 is arranged to bear on said drum, suitable means being provided to adjust the drag thus applied to the drum so as to obtain the desired degree of tension on the rubber threads. From this assembly of mold plates the individual threads T are led through a comb 35, across the breast beam of the loom to a take-up roll 36. In this manner the high degree of tension which must usually be maintained on the rubber threads during the weaving operation can be applied and controlled very accurately. Fig. 10 also indicates the mechanism for handling the non-elastic yarns or threads, the warp beams being indicated at 37, warp harnesses at 38, and a lay at 40.

Another method of supporting the rubber thread which will be found convenient for some purposes is illustrated in Figs. 8 and 9. A circular disk 41 of paper, fiber, cardboard, or of any suitable material, is coated on one surface with an adhesive, and its tacky surface is then pressed against the surface of the rubber threads T while they are still held in the mold plate 2 after the vulcanizing operation has been completed. When the adhesive has dried and thus secured the threads to the disk 41, the latter is lifted off the mold, whereupon it takes the rubber thread with it. Later, these thread-supporting disks 41 can be slipped on to a shaft, such as that shown at 27 in Fig. 10, loosely held between heads or flanges, like that shown at 31; and the rubber threads can then be unwound from them and guided to any desired points. No key securing the disks against rotation around the shaft is necessary under these circumstances, unless it is desired to apply tension to the thread in the manner above described, because the desired tension can be applied by tightening the flanges or heads against the assembly of disks sufficiently to create the necessary degree of drag, as they rotate on the stationary shaft.

While it is usually most convenient to make the thread in a flat circular mold or disk having a spiral groove cut in one face thereof, this particular shape is not absolutely essential, and equivalent shapes can be substituted for it, when desired. It is also possible to fill the groove of the mold disk with unvulcanized rubber in other ways than by using a calendered sheet as above described; and such methods can be used, when desired. For example, the grooves of a series of molds can be filled in a spreading machine, such as that used in the rubber industry in manufacturing rubber-coated fabrics, or it may conceivably be done by hand. The calendered sheet, however, affords a control of the dimensions of the final product which is very desirable.

It will be evident from the foregoing that this invention provides an exceptionally economical method of producing rubber thread. The size of the thread so made can be predetermined by properly dimensioning the spiral groove and by making the unvulcanized rubber sheet of the proper thickness. Some flexibility in thickness of the thread also can be obtained in a single die simply by varying the thickness of the sheet as explained in connection with Fig. 6. By suitably changing the cross-sectional shape of the groove, the form of the thread also can be modified, as desired.

An important advantage of this invention, as compared to the old method of making cut rubber thread by winding a sheet on a mandrel and then cutting through the entire thickness of the wound mass, is that the final thread can be so easily controlled and handled in accordance with the particular use to be made of it. In the old method much time was occupied in straightening out the tangle of threads resulting from the cutting operation, and getting them into useable form.

While I have herein shown and described a preferred form of apparatus, it will be understood that the method of this invention may be performed with different equipment and that the apparatus features of the invention may be embodied in other forms while still retaining the essential characteristics of this invention.

The product of the method disclosed in this application is not here claimed but is claimed in my application Ser. No. 24,213, filed April 30, 1948.

Having thus described my invention, what I desire to claim as new is:

1. That improvement in methods of manufacturing rubber thread, comprising the steps of providing a mold plate having a continuous spiral groove of uniform dimensions in a face thereof, adjacent convolutions of the groove being separated by an intervening spiral rib, applying a preformed sheet of unvulcanized rubber of substantially the thickness of the rubber thread to be produced to the grooved surface of said mold, pressing said rib substantially through said sheet and the rubber into said groove, pressing, and thereby molding the rubber of the sheet into a continuous rubber thread shaped by said groove.

2. That improvement in methods of manufacturing rubber thread, comprising the steps of depositing unvulcanized rubber in a continuous form in a spiral groove formed in the surface of a mold, vulcanizing the rubber while it is held in said groove, adhesively fastening said thread to a disk while it is still in said mold, and removing the thread from said mold by separating the disk, with the thread held adhesively to its surface, from the mold.

3. An apparatus for manufacturing rubber thread, comprising a mold having a substantially flat surface provided with a spiral groove therein, adjacent convolutions of said groove being separated by a rib, said groove being of uniform cross-sectional shape and dimensions, and means cooperating with said mold to force rubber into said groove whereby it will be shaped into a continuous rubber thread.

4. An apparatus according to preceding claim 3, in which said means includes a yieldingly faced pressure member.

5. An apparatus for manufacturing rubber thread, comprising a mold plate having a continuous spiral groove in one face thereof, said groove being of uniform cross-sectional shape and dimensions, adjacent convolutions of said groove being separated by a spiral rib having a sharp edge, a pressure plate, and means cooperating with said mold plate to force said edge substantially through a rubber sheet interposed between the grooved face of said mold plate and said pressure plate and to force the rubber of said sheet into the groove of the mold plate and thereby to mold the sheet into a continuous rubber thread.

6. That improvement in methods of manufacturing rubber thread in a mold plate having a continuous groove in a face thereof, comprising the steps of filling said groove to the desired level with a preformed, solid, unvulcanized rubber compound and thereby producing a rubber thread in said groove with adjacent convolutions of said thread spaced from each other, and vulcanizing said rubber thread while it is mechanically held, under pressure, in said groove.

7. That improvement in methods of manufacturing rubber thread, comprising the steps of pressing solid, unvulcanized rubber into a continuous groove in the surface of a mold plate and thereby producing a continuous rubber thread the convolutions of which are laterally disconnected from each other, and vulcanizing said rubber thread, under pressure, while it is so held in said groove.

8. That improvement in methods of manufacturing rubber thread, comprising the steps of pressing an unvulcanized sheet of rubber into a continuous groove formed in the surface of a mold plate and thereby producing a continuous rubber thread the convolutions of which are laterally disconnected from each other, vulcanizing said rubber thread while it is so held in said groove, and predetermining the thickness of the thread so produced by initially selecting said sheet rubber of a thickness appropriate to produce a finished thread of the desired guage.

9. That improvement in methods of manufacturing rubber thread, comprising the steps of pressing unvulcanized rubber in a solid form into a spiral groove formed in the surface of a mold plate and thereby producing a rubber thread the convolutions of which are laterally disconnected from each other, vulcanizing said rubber thread while it is so held in said groove, and yieldingly holding the thread pressed into said groove during the vulcanizing operation.

10. That improvement in methods of manufacturing rubber thread, comprising the steps of pressing unvulcanized rubber in a solid form into a spiral groove formed in the surface of a mold plate and thereby producing a rubber thread the convolutions of which are laterally disconnected from each other, vulcanizing said rubber thread while it is so held in said groove, and holding said thread in said groove during the vulcanizing operation by pressure mechanically applied directly to the thread.

11. That improvement in methods of manufacturing rubber thread comprising the steps of pressing a sheet of unvulcanized rubber into a spiral groove formed in closely adjacent convolutions around a center in the flat surface of a mold plate and thereby producing an unvulcanized rubber thread, vulcanizing the thread while it is held in said groove under pressure, adhesively uniting the rubber thread in said groove to the face of a disk of sheet material and removing the thread from said mold by separating the disk, with the thread adhering to it, from the mold so that the vulcanized thread will be mounted on said disk in a spiral pattern.

12. An apparatus according to preceding claim 5, in which said pressure plate has an elastic face for contact with the grooved face of said mold plate, said elastic face being conformable to the grooved face of said mold plate and to the surface of the rubber thread pressed into the grooves of said mold plate.

GEORGE S. VAN VOORHIS.

REFERENCES CITED

The following references are of record in the file of this patent:

UNITED STATES PATENTS

| Number | Name | Date |
| --- | --- | --- |
| 672,909 | Lefferts | Apr. 30, 1901 |
| 768,755 | Kitsee | Aug. 30, 1904 |
| 808,479 | Riddle | Dec. 26, 1905 |
| 1,353,522 | Emerson | Sept. 21, 1920 |
| 1,416,342 | Emerson | May 16, 1922 |
| 1,481,743 | Roberts | Jan. 22, 1924 |
| 1,781,817 | Kenyon | Nov. 18, 1930 |
| 1,909,512 | Abbott, Jr. | May 16, 1933 |
| 1,942,354 | Collings et al. | Jan. 2, 1934 |
| 1,949,506 | Weston | Mar. 6, 1934 |
| 1,978,797 | Hazell | Oct. 30, 1934 |
| 2,055,292 | Hiers | Sept. 22, 1936 |
| 2,294,621 | Kraft | Sept. 1, 1942 |
| 2,310,619 | Dillehay | Feb. 9, 1943 |
| 2,315,721 | Martin | Apr. 6, 1943 |
| 2,385,083 | Kemerer | Sept. 18, 1945 |

FOREIGN PATENTS

| Number | Country | Date |
| --- | --- | --- |
| 2,939 | Great Britain | Feb. 7, 1903 |
| 430,107 | Great Britain | June 13, 1935 |